United States Patent
Kaiser-Nyman et al.

(10) Patent No.: US 9,088,650 B2
(45) Date of Patent: Jul. 21, 2015

(54) PREDICTIVE DIALING BASED ON SIMULATION

(71) Applicant: Impact Dialing, Inc., Oakland, CA (US)

(72) Inventors: Michael R. Kaiser-Nyman, San Francisco, CA (US); Douglas A. Samuelson, Annandale, VA (US); Benjamin J. Swieskowski, Des Moines, IA (US)

(73) Assignee: Impact Dialing, Inc., Oakland, CA (US)

( * ) Notice: Subject to any disclaimer, the term of this patent is extended or adjusted under 35 U.S.C. 154(b) by 266 days.

(21) Appl. No.: 13/688,128

(22) Filed: Nov. 28, 2012

(65) Prior Publication Data

US 2013/0136248 A1 May 30, 2013

Related U.S. Application Data

(60) Provisional application No. 61/564,756, filed on Nov. 29, 2011.

(51) Int. Cl.
*H04M 3/00* (2006.01)
*H04M 5/00* (2006.01)
*H04M 3/44* (2006.01)
*H04M 3/51* (2006.01)

(52) U.S. Cl.
CPC .............. *H04M 3/44* (2013.01); *H04M 3/5158* (2013.01); *H04M 3/51* (2013.01); *H04M 2203/556* (2013.01)

(58) Field of Classification Search
CPC  H04M 3/5158; H04M 3/51; H04M 2203/402
USPC ........................................ 379/266.07, 266.08
See application file for complete search history.

(56) References Cited

U.S. PATENT DOCUMENTS

| | | | |
|---|---|---|---|
| 4,858,120 A | 8/1989 | Samuelson | |
| 5,640,445 A | 6/1997 | David | |
| 8,411,844 B1* | 4/2013 | Anisimov et al. | 379/266.08 |
| 8,767,947 B1* | 7/2014 | Ristock et al. | 379/266.08 |
| 2003/0043832 A1* | 3/2003 | Anisimov et al. | 370/412 |
| 2005/0002515 A1* | 1/2005 | Mewhinney et al. | 379/266.08 |
| 2005/0065837 A1* | 3/2005 | Kosiba et al. | 705/9 |
| 2012/0087486 A1* | 4/2012 | Guerrero et al. | 379/265.02 |

* cited by examiner

*Primary Examiner* — Nafiz E Hoque
(74) *Attorney, Agent, or Firm* — Alleman Hall McCoy Russell & Tuttle LLP

(57) ABSTRACT

Simulation is used to determine optimal dialer parameters for a predictive dialing system. A call history is logged over a period of time for a plurality of outgoing calls initiated by the predictive dialing system. The call history includes call data for each of the outgoing calls. A simulation is run on the call history by adjusting one or more dialer parameters and determining one or more values for those dialer parameter values that provide at least a target agent utilization within the simulation without causing a threshold abandonment rate to be exceeded within the simulation. Timing and/or quantity of outgoing calls to be initiated by the predictive dialing system are determined based, at least in part, on the one or more values for the dialer parameters determined from the simulation. The predictive dialing system initiates outgoing calls in accordance with the determined timing and quantity.

19 Claims, 4 Drawing Sheets

PREDICTIVE DIALING BASED ON SIMULATION

CROSS REFERENCE TO RELATED APPLICATION

The present application claims priority to U.S. provisional patent application No. 61/564,756, titled PREDICTIVE DIALING SYSTEM, filed Nov. 29, 2011, the entire contents of which are incorporated herein by reference in their entirety for all purposes.

BACKGROUND

Companies and organizations whose staff and/or volunteers make large numbers of outbound phone calls often use hardware and/or software systems called "dialers" to improve their callers' ("agents") efficiency. Some dialers automatically dial the next number in a list of telephone numbers after a previous call in that list has been completed or attempted. These systems may be referred to as "power dialers", or if a human agent is required to initiate the next automatic dial for an outgoing call after concluding the previous call, "preview dialers". Because only a fraction of dials for outgoing calls are answered, and those that are answered often take several seconds to be picked up, "predictive dialers" can dial multiple lines for multiple outgoing calls and begin dialing in anticipation of an agent becoming available shortly. Predictive dialers generate a certain percentage of "abandoned" dials in which an outgoing call is answered by a called party at a time when a human agent of the call center is unavailable to serve the outgoing call.

SUMMARY

Predictive dialing based on simulation is disclosed in the form of a predictive dialing system and method of operation. An example method for predictive dialing based on simulation includes determining when and/or how a predictive dialing system should initiate outgoing calls. A call history is logged over a period of time for a plurality of outgoing calls. Simulations on the call history are run with one or more dialer parameters. For each simulation, simulation results such as agent utilization and abandonment rate are calculated. One or more values for the dialer parameters are determined that provide at least a target agent utilization without causing a threshold abandonment rate to be exceeded. The timing and quantity of outgoing calls to be initiated by the predictive dialing system are determined based on the one or more values for those dialer parameters determined from the simulation. For example, dialer parameters values for the number of lines to dial and the length of a phone call at which point an agent is considered available may be varied so that these values are optimized to achieve the target agent utilization given a threshold abandonment rate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The disclosed subject matter pertains to control of outbound telephone call centers, in particular those that use computerized dialing to assist their human agents reach a large number of people. Because the called party who has received an abandoned call (a call where a human agent is unavailable) is less likely to answer on subsequent outbound calling attempts, and because abandonment rates are regulated by the Federal Government, there is a need for predictive dialing systems that improve agent utilization while also not exceeding a threshold abandonment rate. There is also a need for predictive dialing systems to adjust automatically to changing conditions, including changes that may be relatively sudden in terms of the duration of answered calls, the duration of an agent's wrap-up period following conclusion of the call, and the proportion of dial attempts that are answered by called parties.

Predictive dialing systems may be designed and operated to decrease downtime between calls without while maintaining an acceptable abandonment rate. Predictive dialing systems monitor one or more parameters about each outgoing call (e.g. duration of connect, time from start of dialing until answer, proportion of call attempts that result in an answer) and then use those parameters to influence the scheduling (e.g. quantity and/or timing) of subsequent outbound calls. Which parameters are used and how they are incorporated into determining the scheduling of future dials may determine the efficiency of the predictive dialer. Accordingly, the disclosed subject matter relates to the determination of the quantity and/or timing of outgoing calls to be initiated by a predictive dialer using simulation to achieve target agent utilization while maintaining acceptable abandonment rates.

Figure 1:
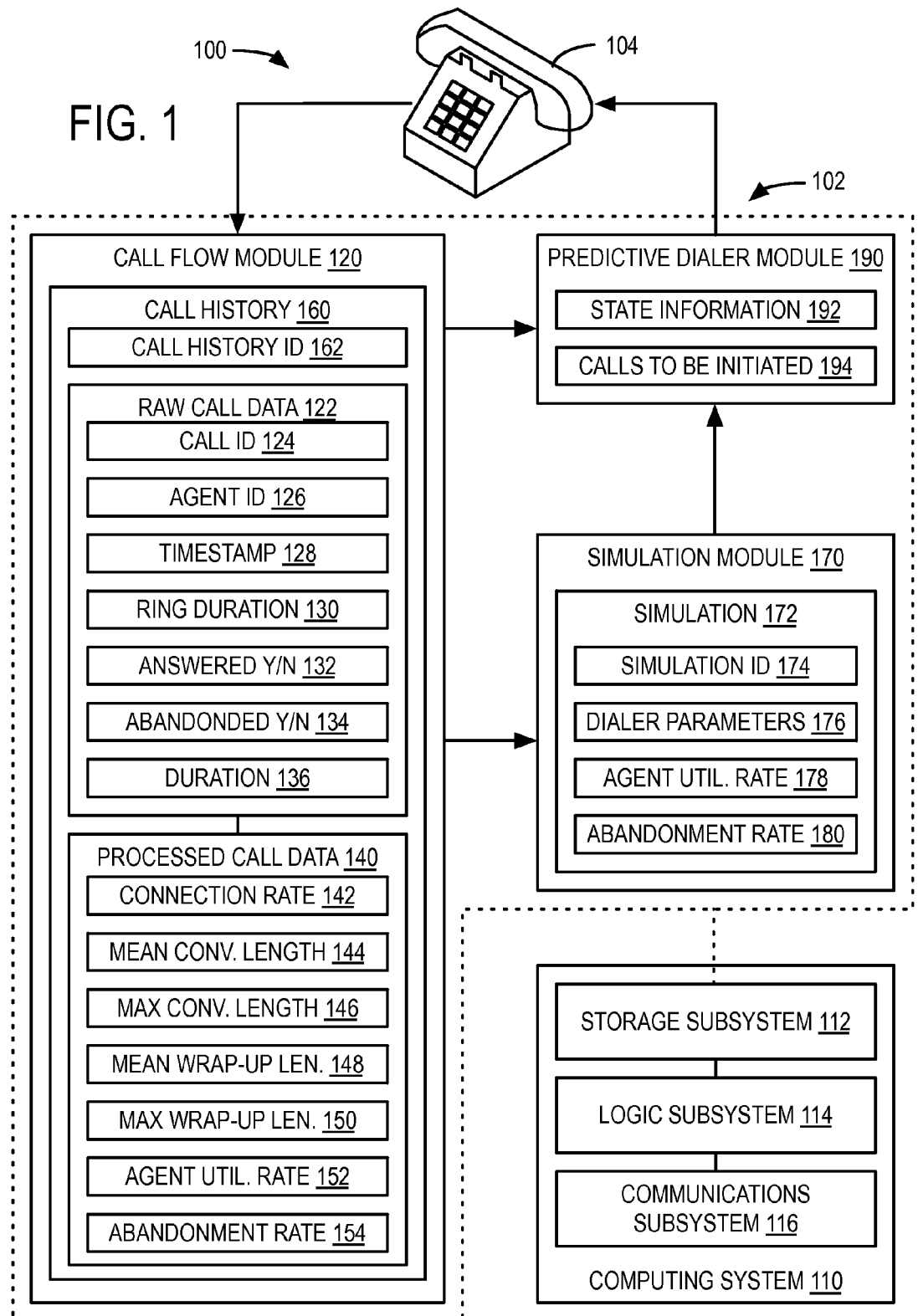
FIG. 1 shows an embodiment of an example use environment for determining outgoing calls to be initiated by a predictive dialing system.

FIG. 1 schematically depicts an embodiment of an example use environment 100 for determining outgoing calls to be initiated by a predictive dialing system 102 for one or more telephones 104. Telephones 104 may be operated by one or more human agents on behalf of which predictive dialing system 102 initiates calls to target entities (e.g., other telephones or VoIP clients) within a communications network. These target entities may be represented by phone numbers or other suitable network identities (e.g., VoIP identities) within the communications network.

While the embodiment of FIG. 1 depicts a single telephone as representing one or more telephones 104, it will be understood that any suitable number of telephones may be present, and may be operated by any suitable number of human agents. Further, while the embodiment of FIG. 1 depicts a "land-line" telephone, it will be understood that the telephones 104 may be of any type, including but not limited to, Voice over Internet Protocol ("VOIP"), wired, wireless, cellular, and the like. Accordingly, the disclosed subject matter may be used in combination with various voice communication protocols over any suitable communications network, including POTS/PSTN, IP/Internet (e.g., via VoIP), wireless 3G/4G, etc.

Predictive dialing system 102 may include a computing system 110 formed from one or more computing devices. These computing devices may reside at the same call center or may be distributed across multiple geographically remote locations where they communicate via a wide area communications network. Computing system 110 includes a logic subsystem 112, a storage subsystem 114, and a communications subsystem 116. Communications subsystem 116 typically interfaces with a communications network, and enables computing system 110 to communicate with telephones 104 and the equipment of called parties, and to bridge telephones 104 with the equipment of called parties. Logic subsystem 112 may include one or more processors or other suitable logic elements. In one example, logic subsystem 112 accesses and executes instructions held in storage subsystem 114. In at least some examples, the instructions may include one or more modules that define respective functional subsystems of predictive dialing system 102.

For example, predictive dialing system 102 may include a call flow module 120. Call flow module 120 may take the form of a computer program configured to log call data (e.g., raw call data 122) for each outgoing call initiated by telephones 104 or by predictive dialing system 102 on behalf of telephones 104. Call data for an individual call may include one or more of a call identifier 124, agent identifier 126, timestamp 128, ring duration 130, an indication 132 of whether or not the call was answered, an indication 134 of whether or not the call was abandoned, and/or a call duration 136. In other embodiments, there may be additional call data items, fewer call data items, and/or different call data items in relation to those depicted in FIG. 1.

Agent identifier 126 may be used to enable tracking of which human agent was associated with a particular call as indicated by a call identifier (e.g., call identifier 124). Timestamp 128 may indicate a date and/or a time that the call was initiated and/or concluded. Ring duration 130 may refer to a period of time that the call was ringing before being answered by the called party or being terminated by the predictive dialing system upon reaching a time-out condition or maximum duration. Duration 136 may refer to the duration of the call from being answered by the called party through conclusion of the call. In other embodiments, there may be additional/fewer call data items and/or different types of call data.

Call data, such as raw call data 122, that has been logged for an individual call may be processed in combination with other calls initiated by telephones 104 or by predictive dialing system 102 on behalf of telephones 104 to obtain processed call data 140. For example, call flow module 120 or other suitable functional entity may compute processed call data 140 based on raw call data obtained from any suitable number of calls. Processed call data 140 may be based on one or more calls logged over a period of time that collectively form a call history 160. Call flow module 120 may log a call history over any suitable period of time (e.g., 10 seconds, 30 seconds, 10 minutes, 30 minutes, 1 hour, 1 day, 1 week, 1 month, 1 year, etc.) for a plurality of outgoing calls initiated by the predictive dialing system.

Processed call data 140 for logged call history 160 may include one or more of a connection rate 142, a mean conversation length 144 (i.e., an average duration), a maximum conversation length 146 (i.e., a maximum duration within a set of calls), a mean wrap-up length of time 148, a maximum wrap-up length of time 150, an agent utilization 152, and/or an abandonment rate 154, among other suitable call data information. Connection rate 142 may refer to a proportion of outgoing calls that were answered by the called party. Agent utilization 152 may refer to an amount of time that human agents are engaged in a task such as a conversation with a called party and/or optionally a wrap-up period following conclusion of a call during which the human agent makes notes to a file concerning the call. Abandonment rate 154 may refer to a number of calls that were answered by the called party for which a human agent was not available as compared to the total number of outgoing calls initiated during the period of time. The call data items described herein may additionally or alternatively include minimums (e.g., minimum conversation length, or minimum wrap-up length) beyond their maximum and mean values.

A call history logged by call flow module 120 over a period of time may be associated with a call history identifier, such as call history identifier 162 for call history 160, enabling individual call histories to be distinguished from each other. Call flow module 120 may log a plurality of call histories over different periods of time, with each call history including call data for a plurality of calls initiated and/or continuing within or throughout its respective period of time. An individual call history may include call data for tens, hundreds, thousands, or millions of calls.

In some examples, call flow module 120 may continuously or periodically monitor calls for telephones 104, log raw call data for those calls, and process the raw call data to obtain processed call data. In some examples, portions of call data logged by call flow module 120 may be stored for a limited amount of time (e.g. only the last 10 minutes of raw call data may be stored) while retaining processed call data for a longer period of time. However, in other examples, all forms of call data or different subsets of call data may be retained.

Predictive dialing system 102 may include a simulator module 170. Simulator module 170 may take the form of a computer program configured to run simulations on call histories logged over a period of time, including the call data logged by call flow module 120. The call data may be used as inputs for one or more simulations run by simulation module 170, such as example simulation 172. Dialer parameters 176 may be adjusted within simulation 172 to achieve a simulated agent utilization 178 and/or a simulated abandonment rate 180 that is based on the adjusted dialer parameters 176 and/or the call data inputs.

In some examples, a simulation, such as example simulation 174, may include an iterative simulation having two or more simulation iterations for converging on one or more defined values or value ranges. As a non-limiting example, simulation module 170 may iterate through all specified combinations of values for dialer parameters 176 within an individual simulation. These specified combinations may include a defined range of dialer parameter values and defined increments into which the defined range of dialer parameter values are to be divided or selected for use in the simulation. However, other suitable techniques may be used to determine optimized values without iterating through all combinations of dialer parameter values within a simulation.

For example, as described in further detail with reference to FIGS. 3 and 4, simulations may be used to determine the timing and/or quantity of outgoing calls to be initiated by the predictive dialing system to achieve at least a target agent utilization (e.g., a maximum agent utilization or other suitable target value) without causing a threshold abandonment rate to be exceeded. Here, for each simulation, including example simulation 172, simulation module 170 computes agent utilization 178 and abandonment rate 130 based on the call data and/or adjusted dialer parameters. In other embodiments, other predictive values (e.g., performance metrics) may be used instead of agent utilization 178 and abandonment rate 180. Each simulation may be associated with a simulation identifier 174 that enables two or more simulations to be distinguished from each other. Furthermore, in some examples, individual iterations within a simulation may be associated with an iteration identifier to enable two or more iterations of the simulation to be distinguished from each other.

Predictive dialing system 102 may include a predictive dialer module 190. Predictive dialer module 190 may take the form of a computer program that utilizes one or more dialer parameter values obtained from one or more simulations in combination with state information 192 to determine a timing and/or quantity of outgoing calls that are to be initiated by the predictive dialing system. A queue or set of calls to be initiated 194 (e.g., a dialing list) may be referenced by the predictive dialer module when initiating an outgoing call. In some examples, predictive dialer module 190 may be configured to loop constantly, calculating how many outgoing calls to initiate at any given time based on dialer parameters determined from simulation and state information 192, and to dial the telephone numbers or other suitable network identifier to initiate those calls.

Non-limiting examples of state information 192 include a total number of human agents currently manning their workstations, a number of currently available human agents, a number of human agents currently engaged in an answered call, a number of human agents currently engaged in a wrap-up period following conclusion of a call, a current duration of each answered call, a current ringing duration of each dialed call, a total number of dialed calls yet to be answered, and/or a length of time since each agent has concluded a call, among other suitable forms of state information. The total number of human agents currently operating their workstations may be identified from a login process and/or logout process in which human agents login to the predictive dialing system at the beginning of a work shift and logout at the conclusion of the work shift at their respective workstations. In some examples, a wrap-up period may be identified as the period of time between conclusion of a call and a time at which a human agent indicates that he or she is ready to accept another call with a called party. State information may include or may be based on call data obtained from call flow module 120.

Predictive dialer module 190, call flow module 120, and simulator module 170 are typically computer programs stored on a mass storage device of a computing device, and executed by a processor using portions of memory of a computing device. Instructions for these computer programs may be stored on a computer readable storage media of storage subsystem 112, such as a hard-drive, DVD-ROM, CD-ROM, FLASH memory device, etc., for execution by the processor of a computing device. Other suitable instructions for implementing the methods described below may also be stored on appropriate computer readable storage media, or on mass storage device of storage subsystem 112, and may cause computing system 110 to implement the methods described herein upon execution by a processor.

While predictive dialer module 190, call flow module 120, and simulator module 170 are depicted separately, it will be understood that they may be arranged in any suitable combination. Thus, some or all of these modules may be integrated in a single program, or distributed amongst several programs, and may be executed on a single computing device, or on a plurality of different computing devices. Further, it will be understood that the term "program' refers to a functional collection of computer code, and may include one or more executable files, data files, data libraries, etc.

Figure 2:
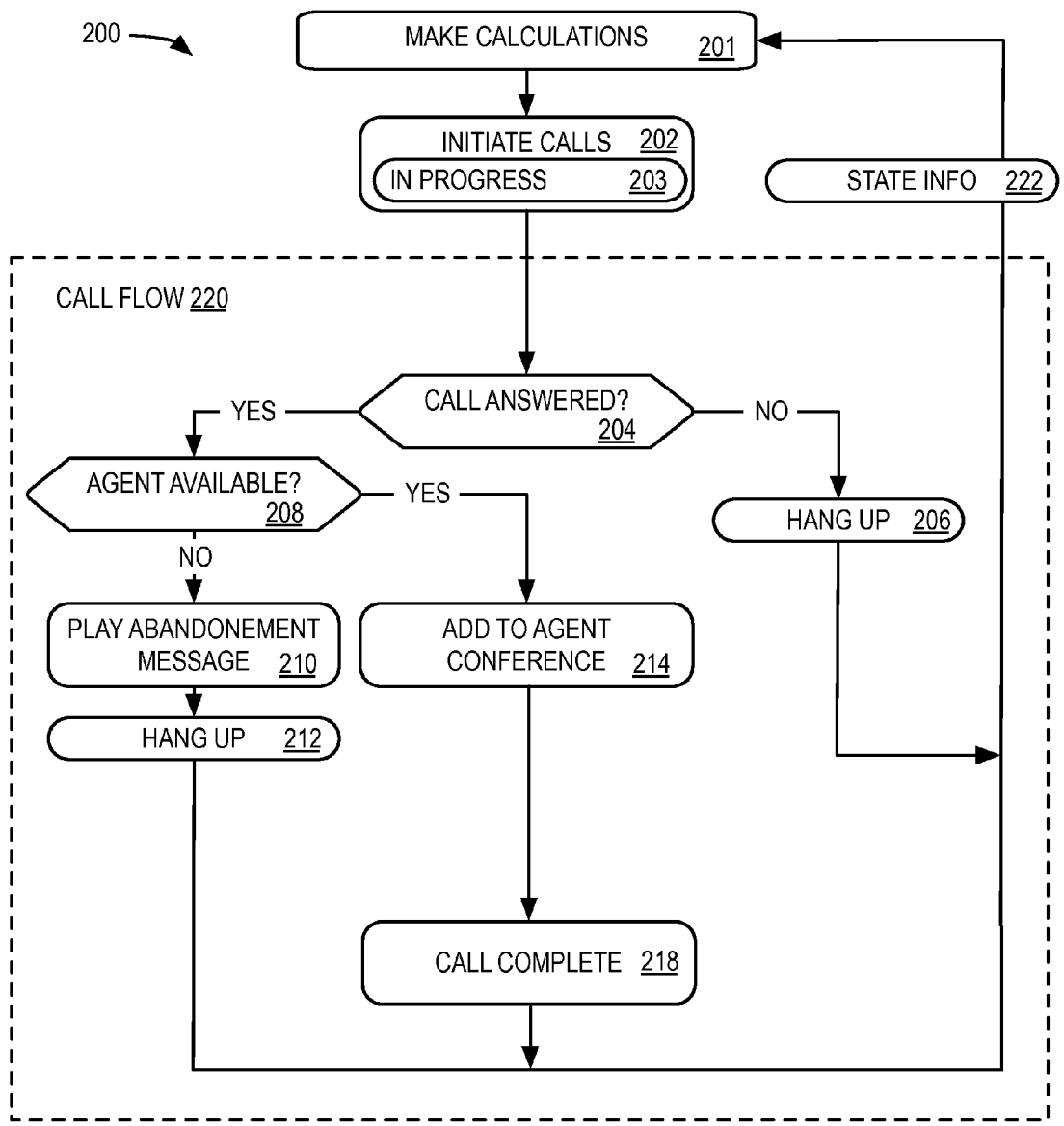
FIG. 2 shows a process flow depicting an embodiment of an example method for determining outgoing calls to be initiated by a predictive dialing system.

FIG. 2 shows a process flow depicting an embodiment of an example method 200 for determining outgoing calls to be initiated by a predictive dialing system. As a non-limiting example, method 200 may be performed, at least in part, by predictive dialing system 102 of FIG. 1.

At block 201, method 200 examines the current state of the system (i.e., state information 222), including but not limited to the number of agents available for a call, and the number of agents not available for a call but predicted to become available soon, to determine the appropriate number of lines to dial at the present moment. State information 222 may additionally or alternatively include the various forms of call data previously described with reference to FIG. 1. In some examples, a predictive algorithm may use, as inputs for its calculations, state information 222 in combination with an output of a simulation (i.e., simulation results), such as may be obtained from the example simulation techniques described with reference to FIGS. 3 and 4. Regardless of the algorithm that is used, once the calculations have been completed, method 200 may continue to block 202. The one or more outgoing calls (one or more dials) to be initiated at block 202 are effected by the calculations of block 220.

As indicated in block 202, method 200 includes initiating calls to one or more telephone numbers or other suitable network identities. In determining the quantity of outgoing calls to initiate (e.g., the amount of dials to be made), method 200 may consider the number of dials in progress 203, which may also be obtained from state information 222. For example, if five simultaneous dials are needed and two are currently in progress as indicated by state information 222, only three new dials would be initiated.

State information 222 may be obtained from previously described call flow module 120 that monitors outgoing calls. A non-limiting example of a call flow for an outgoing call is described in FIG. 2 with reference to call flow 220. It will be understood that call flow 220 is a non-limiting example of a call flow that may be used in combination with the simulation and call initiation techniques described herein. It will be understood that other suitable call flows that differ from call flow 220 may be used in combination with these simulation and call initiation techniques. In some examples, call flow module 120 may be configured to manage and/or process outgoing calls according to example call flow 220 or other suitable call flow.

At block 204 of call flow 220, method 200 evaluates if each call has been answered. If the call has not been answered, method 200 determines whether it has rung for a sufficiently long period of time. If so, it hangs up the line at block 206; if not, it lets the line continue ringing. A Either way, it continues on to block 220. If the call has been answered, method 200 moves to block 208.

At block 208, method 200 evaluates if an agent is available to join the answered call. If an agent is not available (this scenario is known as abandonment), method 200 optionally plays an abandonment message at block 210, hangs up the line at block 212. If an agent is available to join the call, method 200 moves on to block 214 where the answered call is connected to the available agent. From 214, method 200 continues to block 218 in which it is determined that the call has been completed.

State information 222 may include an indication of the state of an outgoing call at any point within a call flow, such as example call flow 220 or other suitable call flow. For example, state information 222 may indicate whether the call has been answered at 204, whether an agent is available at 208, whether an agent has been added to call at 214, whether the call has been completed at 218, or whether the call has ended in a hang up at 212 or 206.

Figure 3:
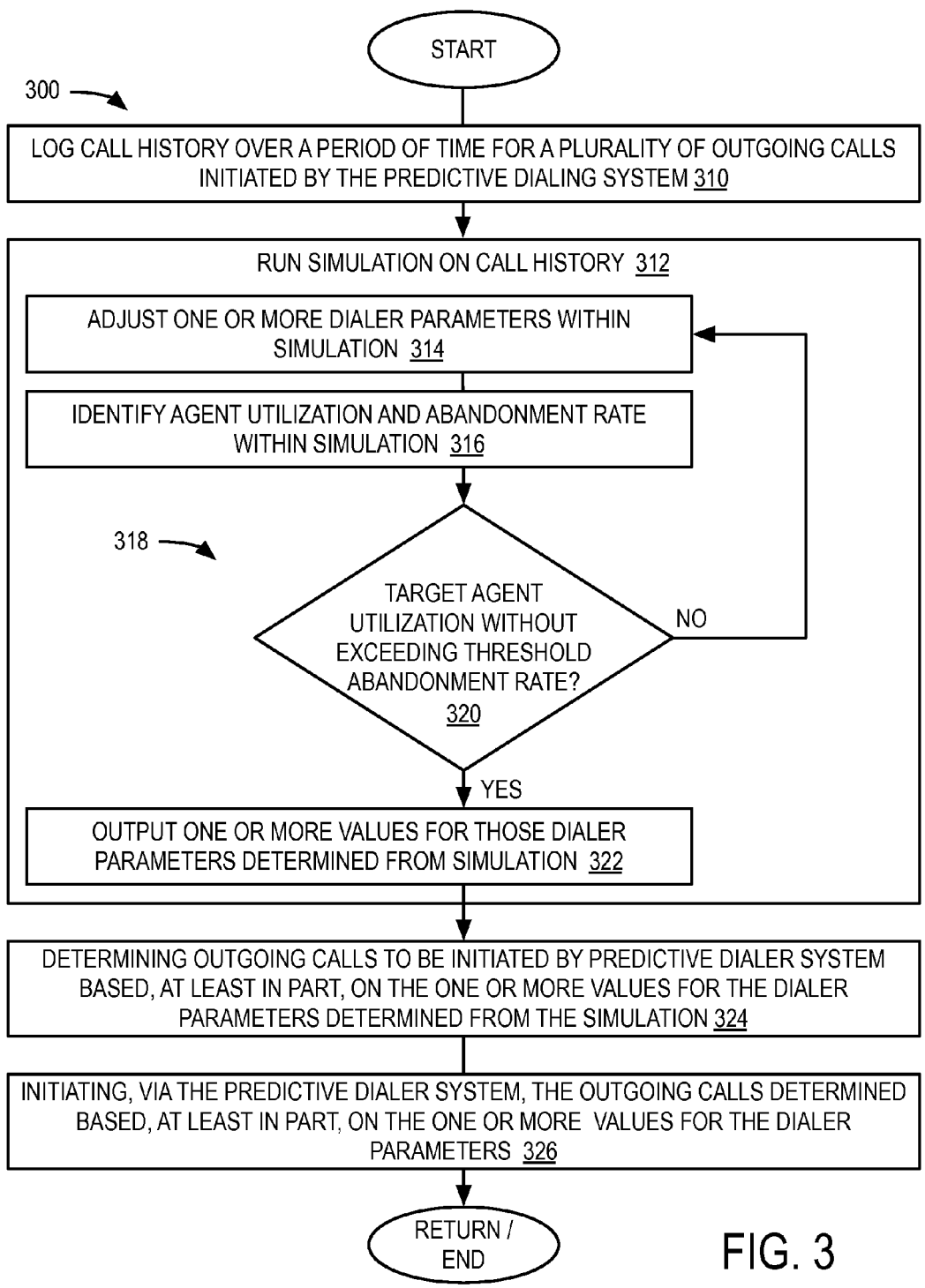
FIG. 3 shows a process flow depicting an embodiment of an example method of using a simulation to determine outgoing calls to be initiated by a predictive dialing system.

FIG. 3 shows a process flow depicting an embodiment of an example method 300 of using simulation to determine outgoing calls to be initiated by a predictive dialing system. As a non-limiting example, method 300 may be performed, at least in part, by predictive dialing system 102 of FIG. 1.

At 310, the method includes logging a call history over a period of time for a plurality of outgoing calls initiated by the predictive dialing system. As previously described in the context of FIG. 1, the call history may include call data for each of the outgoing calls. The plurality of outgoing calls may include all of the outgoing calls initiated or existing during the period of time, or a subset (e.g., a sampling) of the outgoing calls initiated or existing during the period of time. Non-limiting examples of call data the call data associated with each outgoing call of the call history include date of the call, time of the call, ring duration, whether the call was answered, whether the call was abandoned, and/or call duration, among other suitable forms of call data.

In some examples, the period of time over which call history is logged may include a preceding window of time ending at a time when the simulation is run at 312. In some examples, the period of time over which call history is logged may be programmatically determined to include a pre-defined number of outgoing calls (e.g., ten, one hundred, one thousand, one million, etc.) and/or a pre-defined time range of outgoing calls (e.g., 10 seconds, 30 seconds, 1 minute, 10 minutes, 1 day, 1 week, 1 month, 1 year, etc.).

At 312, the method includes running a simulation on the call history. In one example, the simulation may be run based on the call data by adjusting one or more dialer parameters within the simulation at 314, identifying agent utilization and abandonment rate within the simulation at 316, and determining one or more values for those dialer parameter values at 318 that provide at least a target agent utilization (e.g., a maximum agent utilization or other suitable target value) within the simulation without causing a threshold abandonment rate to be exceeded within the simulation. As one example target agent utilization may be set to a maximum agent utilization previously achieved by the predictive dialing system either within a simulation or within an actual use-scenario. The method at 318 may include determining whether the one or more dialer values currently used by the predictive dialer module to initiate outgoing calls provide at least the target agent utilization within the simulation while maintaining an acceptable abandonment rate within the simulation.

The one or more dialer parameters may include one or more of a connection rate, a mean conversation length, a maximum conversation length, a mean wrap-up length, a maximum wrap-up length, and/or an abandonment rate. However, other suitable dialer parameters may be considered and adjusted.

As one example, the method at 318 may include comparing the agent utilization and abandonment rate identified at 316 to the target agent utilization and the threshold abandonment rate to determine at 320 whether target values or threshold conditions have been satisfied within the simulation. If target values or threshold conditions have not be satisfied within the simulation (e.g., the agent utilization is less than the target agent utilization and/or the abandonment rate is greater than the threshold abandonment rate for the dialer parameters adjusted at 314), then the process flow may return to 314 where the one or more dialer parameters may be further adjusted for a subsequent iteration of the simulation. If target values and threshold conditions have been satisfied within the simulation (e.g., the agent utilization provides at least the target agent utilization and the abandonment rate has not exceeded the threshold abandonment rate within the simulation), then the process flow may proceed to 322 where the one or more values for the one or more dialer parameters determined from the simulation are output and/or stored.

In some examples, the target agent utilization is a maximum agent utilization value (i.e., an optimized agent utilization) without causing the threshold abandonment rate to be exceeded within the simulation. The target agent utilization may be a pre-defined agent utilization or a user-defined agent utilization. The threshold abandonment rate may be a pre-defined abandonment rate or a user-defined abandonment rate. In some examples, an administrator of the predictive dialing system may define and/or adjust the agent utilization and/or abandonment rates that are used within the simulation.

At 324, the method includes determining outgoing calls to be initiated by the predictive dialing system based, at least in part, on the one or more values for the dialer parameters determined from the simulation. In some examples, the method at 324 may include determining a timing of the outgoing calls and/or determining a quantity of the outgoing calls. Any suitable technique may be used to determine timing and/or quantity of outbound calls to be initiated by the predictive dialing system. Typically, the determination of timing and/or quantity of outbound calls may be further based on state information, including a total number of human agents currently operating their workstations, a number of currently available human agents, a number of human agents currently engaged in an answered call, a number of human agents currently or likely engaged in a wrap-up period following conclusion of a call, a current duration of each answered call, a current ringing duration of each dialed call, a total number of dialed calls yet to be answered, and/or a length of time since each agent has concluded a call, among other suitable forms of state information. Hence, a combination of state information and dialer parameter values may be used to determine timing and/or quantity for initiating outgoing calls.

At 326, the method includes initiating, via the predictive dialing system, the outgoing calls determined based, at least in part, on the one or more values for the dialer parameters determined from the simulation. Dialer parameters values that are obtained from a simulation may be referred to as applied dialer parameter values if used by a predictive dialer module to initiate outgoing calls. For example, the predictive dialing system may initiate one or more outgoing calls according to the timing and/or quantity determined at 324. In certain contexts, the predictive dialing system may initiate a number of outgoing calls in parallel or substantially in parallel in periodic or temporally distinct groups or batches. As one example, the periodic or temporally distinct groups or batches of outgoing calls may be initiated responsive to an update of dialer parameter values (e.g., an update to the applied dialer parameter values) and/or state information at the predictive dialer module.

Where the simulation includes an iterative simulation, the method at 312 may include iteratively adjusting the one or more dialer parameters at 314, identifying agent utilization and abandonment rates at 316, and determining one or more values for those dialer parameters at 318 over two or more simulation iterations until at least a target agent utilization within a simulation iteration is achieved without causing a threshold abandonment rate to be exceeded within that iteration simulation. The determination of outgoing calls to be initiated by the predictive dialing system at 324 may be based, at least in part, on the one or more values for the dialer parameters determined from that iteration simulation.

Method 300 of FIG. 3 may be applied to each call history of a plurality of successive call histories. For example, a plurality of successive call histories may be logged in which each call history including call data for outgoing calls initiated by the predictive dialing system within a respective period of time. Here, each period of time forms a sliding window of time among the plurality of successive call histories. For each call history of the plurality of successive call histories, a respective simulation may be run on that call history by adjusting one or more dialer parameters and determining one or more updated values for those dialer parameter values that provide at least the target agent utilization within that simulation without causing the threshold abandonment rate to be exceeded within that simulation. Outgoing calls to be initiated by the predictive dialing system may be determined based, at least in part, on the one or more updated values for the dialer parameters determined from that simulation. With each successive call history that is logged, a new simulation may be run, and updated values for the dialer parameters may be determined. The timing and quantity of outgoing calls initiated by the predictive dialing system may be continuously or periodically influenced by updated values for the dialer parameters as such updates are obtained. As a non-limiting example, call histories may be logged every 30 seconds, and simulations may be run on those logged call histories, enabling dialer parameter values used by the predictive dialer module to initiate outgoing calls to be updated every 30 seconds.

Figure 4:
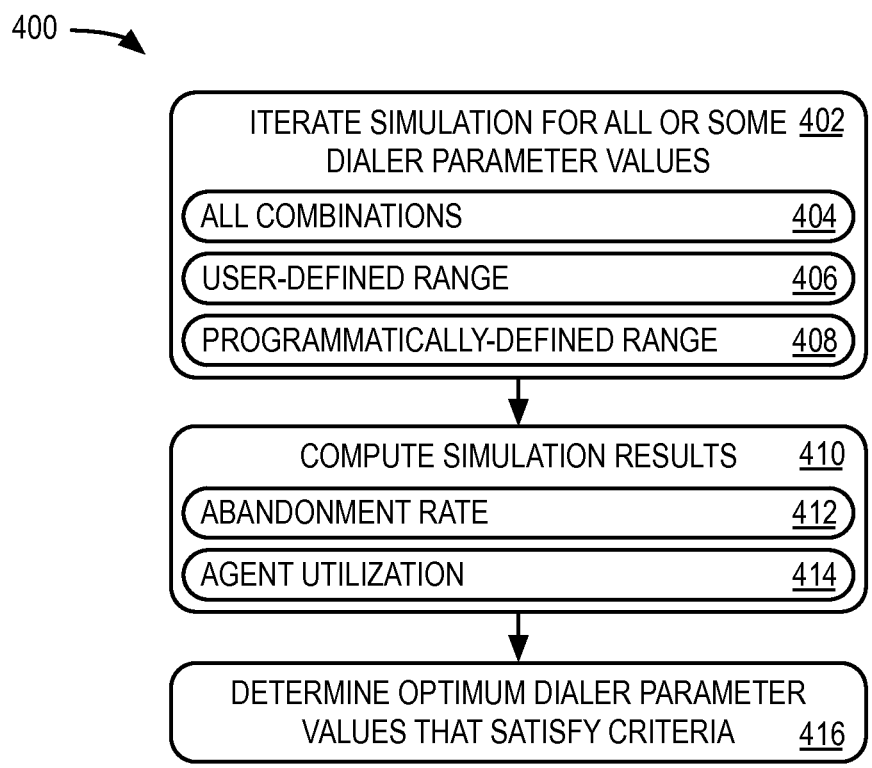
FIG. 4 shows a process flow depicting an embodiment of an example method for using simulation to determine outgoing calls to be initiated by a predictive dialing system.

FIG. 4 shows a process flow depicting an embodiment of an example method 400 for using simulation to determine outgoing calls to be initiated by a predictive dialer. As a non-limiting example, method 400 may be performed, at least in part, by predictive dialing system 102 of FIG. 1. At block 402, method 400 iterates a simulation over a set of dialer parameter values. The set of dialer parameter values may include all combinations of values 404, a user-defined range of values 406, or a programmatically-defined range of values 408.

At block 410, method 400 computes simulation results for each combination of dialer parameter values. The simulation results may, for example, include abandonment rate 412 and agent utilization 414. In other embodiments, there may be additional/fewer simulation results and/or different types of simulation results. At block 416, method 400 determines optimum dialer parameter values that satisfy simulation result criteria such as a target agent utilization and a threshold abandonment rate. The optimum dialer parameter values may be, for example, the set of dialer parameter values that maximize agent utilization 414 or exceed a previous maximum agent utilization while ensuring abandonment rate 412 does not exceed a maximum abandonment rate (e.g., a threshold abandonment rate).

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of determining outgoing calls to be initiated by a predictive dialing system comprising a storage subsystem and a logic subsystem, the method comprising:
    logging in the storage subsystem a call history over a period of time for a plurality of outgoing calls initiated by the predictive dialing system, the call history including call data for each of the outgoing calls;
    executing a program with the logic system to run a simulation on the call history by adjusting one or more dialer parameters and determining one or more values for those dialer parameter values that provide at least a target agent utilization within the simulation without causing a threshold abandonment rate to be exceeded within the simulation; and
    with the program, determining outgoing calls to be initiated by the predictive dialing system based, at least in part, on the one or more values for the dialer parameters determined from the simulation;
    wherein the period of time is a preceding window of time ending at a time when the simulation is run.

2. The method of claim 1, wherein the call data associated with each outgoing call of the call history includes one or more of: date of the call, time of the call, ring duration, whether the call was answered, whether the call was abandoned, and/or call duration.

3. The method of claim 1, wherein the period of time is programmatically determined to include a pre-defined number of outgoing calls or a pre-defined time range of outgoing calls.

4. The method of claim 1, wherein the one or more dialer parameters include one or more of: connection rate, mean conversation length, maximum conversation length, mean wrap-up length, maximum wrap-up length, and/or abandonment rate.

5. The method of claim 1, wherein the target agent utilization is a maximum agent utilization value without causing the threshold abandonment rate to be exceeded within the simulation.

6. The method of claim 1, wherein the target agent utilization is a pre-defined agent utilization or a user-defined agent utilization.

7. The method of claim 1, further comprising:
    initiating, via the predictive dialing system, the outgoing calls determined based, at least in part, on the one or more values for the dialer parameters determined from the simulation.

8. The method of claim 1, wherein determining outgoing calls to be initiated by the predictive dialing system includes determining a timing of the outgoing calls and/or determining a quantity of the outgoing calls.

9. The method of claim 1, wherein the simulation includes an iterative simulation; and wherein the method further comprises:
    iteratively adjusting the one or more dialer parameters and determining one or more values for those dialer parameters over two or more simulation iterations until at least a target agent utilization within a simulation iteration is achieved without causing a threshold abandonment rate to be exceeded within that iteration simulation; and
    determining the outgoing calls to be initiated by the predictive dialing system based, at least in part, on the one or more values for the dialer parameters determined from that iteration simulation.

10. The method of claim 1, wherein the call history is one of a plurality of successive call histories, the method further comprising:

logging the plurality of successive call histories, each call history including call data for outgoing calls initiated by the predictive dialing system within a respective period of time that forms a sliding window of time among the plurality of successive call histories;

for each call history of the plurality of successive call histories:
running a respective simulation on that call history by adjusting one or more dialer parameters and determining one or more updated values for those dialer parameter values that provide at least the target agent utilization within that simulation without causing the threshold abandonment rate to be exceeded within that simulation; and
determining outgoing calls to be initiated by the predictive dialing system based, at least in part, on the one or more updated values for the dialer parameters determined from that simulation.

11. Non-transitory computer readable media holding instructions executable by a processor of a predictive dialing system to:
log in the computer readable media a call history over a period of time for a plurality of outgoing calls initiated by the predictive dialing system, the call history including call data for each of the outgoing calls;
run a simulation on the call history by adjusting one or more dialer parameters and determining one or more values for those dialer parameter values that provide at least a target agent utilization within the simulation without causing a threshold abandonment rate to be exceeded within the simulation;
determine outgoing calls to be initiated by the predictive dialing system based, at least in part, on the one or more values for the dialer parameters determined from the simulation; and
initiate, via the predictive dialing system, the outgoing calls determined based, at least in part, on the one or more values for the dialer parameters determined from the simulation;
wherein the period of time is a preceding window of time ending at a time when the simulation is run.

12. The storage subsystem of claim 11, wherein the simulation includes an iterative simulation; and
wherein the instructions are further executable by the logic subsystem to:
iteratively adjust the one or more dialer parameters and determine one or more values for those dialer parameters over two or more simulation iterations until at least a target agent utilization within a simulation iteration is achieved without causing a threshold abandonment rate to be exceeded within that iteration simulation; and
determine the outgoing calls to be initiated by the predictive dialing system based, at least in part, on the one or more values for the dialer parameters determined from that iteration simulation.

13. The storage subsystem of claim 11, wherein the call data associated with each outgoing call of the call history includes one or more of: date of the call, time of the call, ring duration, whether the call was answered, whether the call was abandoned, and/or call duration.

14. The storage subsystem of claim 11, wherein the period of time is programmatically determined to include a pre-defined number of outgoing calls and/or a pre-defined time range of outgoing calls.

15. The storage subsystem of claim 11, wherein the one or more dialer parameters include one or more of: connection rate, mean conversation length, maximum conversation length, mean wrap-up length, maximum wrap-up length, and/or abandonment rate.

16. The storage subsystem of claim 11, wherein the target agent utilization is a maximum agent utilization value without causing the threshold abandonment rate to be exceeded within the simulation.

17. The storage subsystem of claim 11, wherein the target agent utilization is a pre-defined agent utilization or a user-defined agent utilization.

18. The storage subsystem of claim 11, wherein determining outgoing calls to be initiated by the predictive dialing system includes determining a timing of the outgoing calls and/or determining a quantity of the outgoing calls to be initiated.

19. A predictive dialing system to determine outgoing calls to be initiated by the predictive dialing system, the system comprising a storage subsystem and a logic subsystem configured to execute a program comprising:
a call flow module configured to log in the storage subsystem a call history over a period of time for a plurality of outgoing calls, the call history including call data for each of the outgoing calls;
a simulator module configured to run an iterative simulation on the call history by iteratively adjusting the one or more dialer parameters and determining one or more values for those dialer parameter values over two or more simulation iterations until at least a target agent utilization within a simulation iteration is achieved without causing a threshold abandonment rate to be exceeded within that iteration simulation; and
a predictive dialer module configured to determine a timing and quantity of outgoing calls to be initiated by the predictive dialing system based, at least in part, on the one or more values for the dialer parameters determined from that iteration simulation, and initiate the outgoing calls in accordance with the timing and quantity;
wherein the period of time is a preceding window of time ending at a time when the simulation is run.

* * * * *